United States Patent [19]

Nakamura et al.

[11] Patent Number: 4,896,990
[45] Date of Patent: Jan. 30, 1990

[54] SUPPORT STRUCTURE OF A ROTATABLE LEVER

[76] Inventors: Hitoshi Nakamura; Yasuaki Hori, both of c/o Ohi Seisakusho Co., Ltd., 14-7, Maruyama 1-chome, Isogo-ku, Yokohama-shi, Kanagawa-ken, Japan

[21] Appl. No.: 169,295

[22] Filed: Mar. 17, 1988

[30] Foreign Application Priority Data

May 15, 1987 [JP] Japan ................... 62-71652

[51] Int. Cl.⁴ .............................. F16B 9/00
[52] U.S. Cl. .................. 403/162; 403/408.1; 411/508
[58] Field of Search ............... 403/161, 163, 289, 354, 403/408.1, 162, 145, 70, 71; 411/508, 509; 24/453, 297

[56] References Cited

U.S. PATENT DOCUMENTS

| 2,921,819 | 1/1960 | Rifkin | 403/162 X |
| 3,745,612 | 7/1973 | Seckerson | 411/508 X |
| 3,803,670 | 4/1974 | Johnson | 411/508 |
| 3,954,344 | 5/1976 | Nakama | 403/408.1 X |
| 4,135,694 | 1/1979 | Stegenga et al. | 403/162 X |
| 4,315,614 | 2/1982 | Stegenga et al. | 403/162 X |
| 4,354,298 | 10/1982 | Tanaka et al. | 403/408.1 X |
| 4,579,473 | 4/1986 | Brugger | 403/163 |
| 4,697,948 | 10/1987 | Fukuda | 403/71 |
| 4,715,095 | 12/1987 | Takahashi | 411/508 X |

FOREIGN PATENT DOCUMENTS 59-8463 1/1984 Japan .
60-159161 10/1985 Japan .

Primary Examiner—Andrew V. Kundrat
Assistant Examiner—Peter M. Cuomo
Attorney, Agent, or Firm—Helfgott & Karas

[57] ABSTRACT

A support structure of a rotatable lever comprises a cylindrical shaft portion integrally formed with a support body; a base member connected to the support body and having a shaft hole; an auxiliary shaft member having a shaft main body supported by the cylindrical shaft portion and a projecting shaft inserted into the shaft hole of the base member and supported by the base member; a device for inserting the shaft main body into the cylindrical shaft portion; and an elastic device disposed between the base member and the shaft main body of the auxiliary shaft member and biasing, towards the cylindrical shaft portion, the rotatable lever which is disposed between the cylindrical shaft portion and the elastic device.

7 Claims, 4 Drawing Sheets

SUPPORT STRUCTURE OF A ROTATABLE LEVER

The present invention relates to an improvement of a support structure of a rotatable lever used in a door locking device for a vehicle, etc.

BACKGROUND OF THE INVENTION

In general, a conventional support structure of a rotatable lever used in a door locking device for a vehicle has a construction in which a steel shaft is extended through and caulked onto a base plate.

However, in such a structure, rattle noises are generated and rust is generated, and it is necessary to dispose a device for caulking the shaft, etc.

To remove such problems, in the conventional apparatus, as shown in FIG. 1, a rotatable lever 101 is supported in a cantilever shape by a shaft cylinder 121 integral with a body 102 made of synthetic resin, and an auxiliary shaft member 103 having elastic tongue pieces 103a is fitted to the shaft cylinder 121, so that the elastic tongue pieces 103a prevent the lever 101 from being extracted from the shaft cylinder 121.

However, in such a structure mentioned above, the shaft cylinder 121 is greatly flexed, and the operation of the lever is inaccurate and unstable, so that the locking and unlocking of the door are not reliably performed, and the mechanical strength of the shaft cylinder 121 is reduced and the durability thereof is low.

SUMMARY OF THE INVENTION

To overcome the problems mentioned above, an object of the present invention is to provide a support structure of a rotatable lever having a reliable bearing portion and having a high mechanical strength.

With the above object in view, the present invention resides in a support structure of a rotatable lever comprising a cylindrical shaft portion integrally formed with a support body; a base member connected to the support body and having a shaft hole; an auxiliary shaft member having a shaft main body supported by the cylindrical shaft portion and a projecting shaft inserted into the shaft hole of the base member and supported by the base member; means for inserting the shaft main body into the cylindrical shaft portion; and elastic means disposed between the base member and the shaft main body of the auxiliary shaft member and biasing, towards the cylindrical shaft portion, the rotatable lever which is disposed between the cylindrical shaft portion and the elastic means.

BRIEF DESCRIPTION OF THE DRAWINGS

The present invention will be more apparent from the preferred embodiments thereof in conjunction with the accompanying drawings in which.

DETAILED DESCRIPTION OF THE PREFERRED EMBODIMENTS

The preferred embodiments of a support structure of a rotatable lever in the present invention will now be described with reference to the accompanying drawings.

Figure 1:
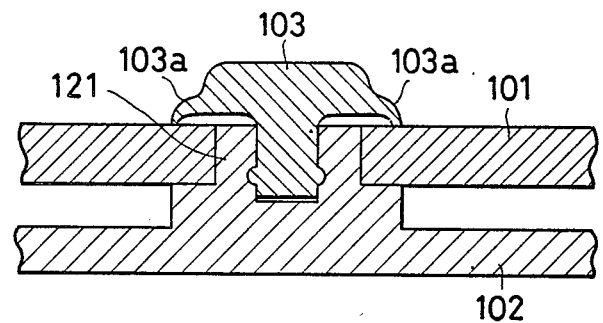
FIG. 1 is a partially broken enlarged view of a conventional support structure of a rotatable lever used in a door lock.
Figure 2:
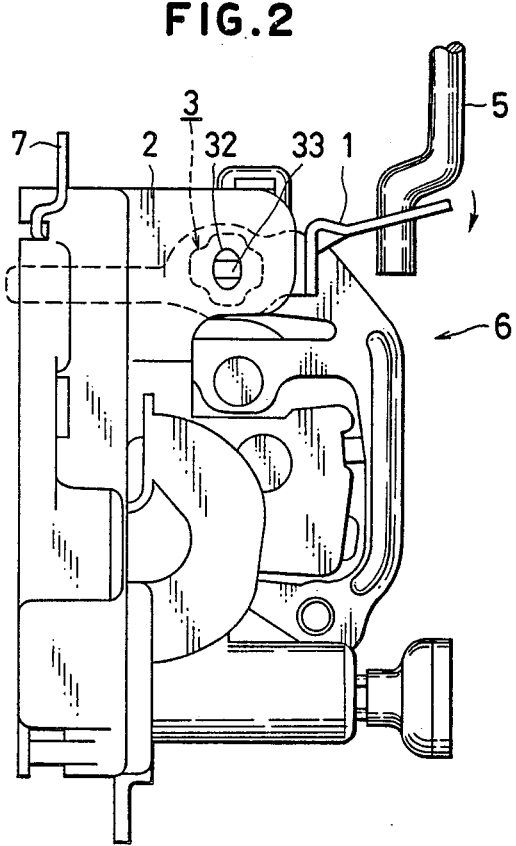
FIG. 2 is a front view of a door lock constructed in accordance with one embodiment of the present invention.
Figure 3:
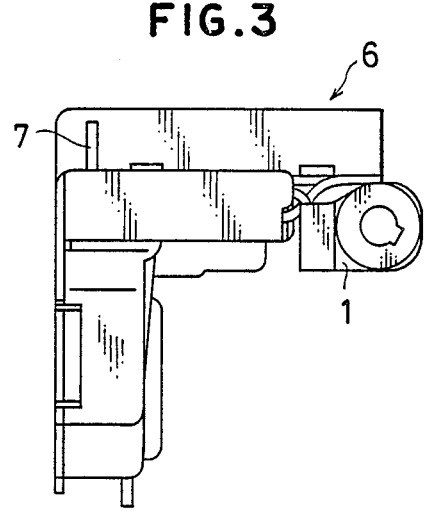
FIG. 3 is a plan view of the door lock of FIG. 2.

In FIGS. 2 and 3, an outside lever 1 constituting a rotatable lever is rotatably supported by a support body 2, and is prevented from being extracted from the body 2 by an auxiliary shaft member 3.

Figure 4:
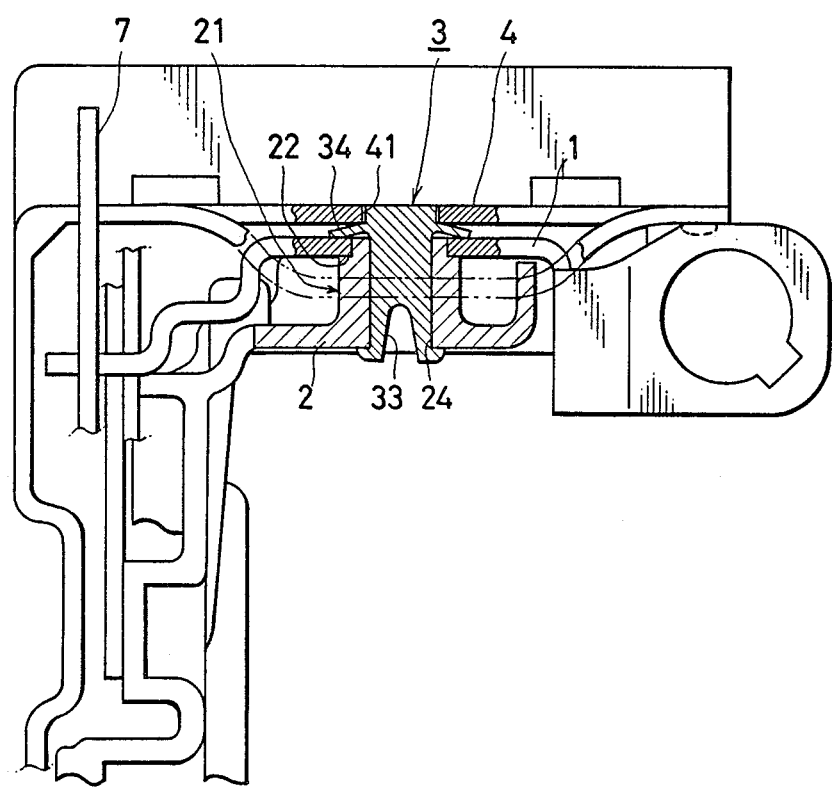
FIG. 4 is a partially broken enlarged view of a support structure of a rotatable lever used in the door lock of FIG. 2.

As shown in FIG. 4, the outside lever 1 is fitted onto a step portion 22 disposed in the outer circumference of a cylindrical shaft portion 21 at an end thereof integrally projecting from one side of the body 2. The outside lever 1 is pushed and positioned by elastic pieces 34 projecting towards the outer circumference of the auxiliary shaft member 3 fitted into the cylindrical shaft portion 21. The body 2 is preferably made of synthetic resin.

Figure 5:
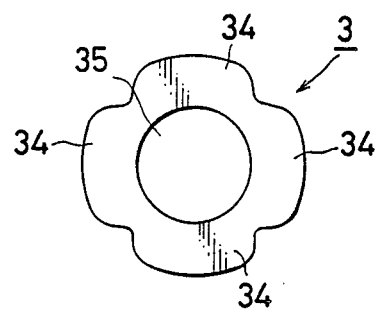
FIG. 5 is a plan view of an auxiliary shaft member which constitutes a main portion of the support structure of the rotatable lever of FIG. 2.
Figure 6:
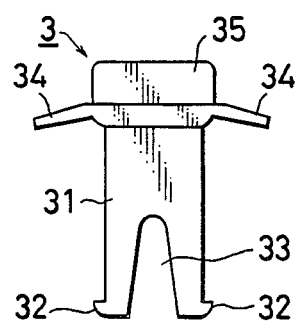
FIG. 6 is a front view of the auxiliary shaft member.

As shown in FIGS. 5 and 6, the auxiliary shaft member 3 is similarly made of synthetic resin, and has a shaft main body 31 fitted into the cylindrical shaft portion 21 and having a length approximately equal to the length of the cylindrical shaft portion 21. The main shaft body 31 has, at an end thereof, an axial slit 33 and a flange portion 32 engaged with an edge of an opening 24 in a deep portion of the cylindrical shaft portion 21. As shown in FIG. 5, four elastic tongue pieces 34 for pressing the outside lever 1 to the outer circumferential step portion 22 project at the base end of the shaft main body 31 in the radial direction. Further, a projecting shaft 35 axially projects from the base end of the shaft main body 31 to the upper or outer side thereof.

Figure 7:
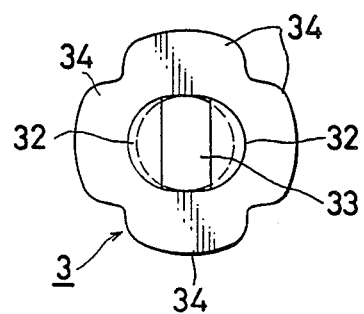
FIG. 7 is a bottom view of the auxiliary shaft member.

The outer diameter of the shaft main body 31 is approximately equal to the inner diameter of the cylindrical shaft portion 21. The axial slit 33 is disposed to reduce the outer diameter of the flange portion 32 and to enable the flange portion 32 to pass through and be inserted into the cylindrical shaft portion 21 as shown in FIGS. 6 and 7.

The four elastic tongue pieces 34 are slightly inclined at the respective ends thereof on the front side, i.e., on the one end side of the cylindrical shaft portion 21 to apply a biasing force to the rotatable lever 1 at the one end of the cylindrical shaft portion 21.

The outer diameter of the projecting shaft 35 is approximately equal to the inner diameter of a shaft hole 41 disposed in the base plate 4, and the axial length of the projecting shaft 35 is approximately equal to the thickness of the base plate 4, and the projecting shaft 35 is fitted into the shaft hole 41.

As shown in FIG. 2, a rod 5 is connected to an end of the outside lever 1. The outside lever 1 is connected to an unillustrated outside handle through the rod 5, and the other end of the outside lever 1 is connected to an open layer 7 for releasing an engaging mechanism within the door lock 6.

The outside lever 1 is pivoted through the rod 5 by pulling the outside handle to rotate the open lever 7 so that the engaging mechanism within the door lock 6 is released.

In this case, the auxiliary shaft member 3 and the cylindrical shaft portion 21 for pivotally supporting the outside lever 1 are supported by both the support body 2 and the base plate 4, so that both the auxiliary shaft member 3 and the cylindrical shaft portion 21 receive a load applied to the shaft of the outside lever 1. Accordingly, the flexed amount of the cylindrical shaft portion by the load is reduced, and the lever is stably pivoted, and the door is reliably locked and unlocked.

When the auxiliary shaft member 3 and the body 2 are made of synthetic resin, the auxiliary shaft member 3 and the body 2 are elastically fitted to each other so that the support structure is easily assembled.

Further, since the elastic tongue pieces 34 of the auxiliary shaft member 3 press the outside lever 1 towards the step portion 22, the outside lever 1 is stably pivoted to a predetermined position, and is reliably locked and unlocked.

Figure 8:
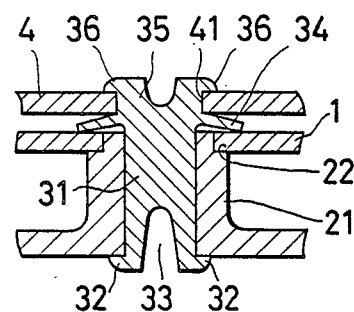
FIG. 8 is a partially broken enlarged view of a support structure of another rotatable lever used in the door lock.

FIG. 8 shows another embodiment of the auxiliary shaft member.

In this embodiment, an auxiliary shaft member 3 has elastic tongue pieces 36 elastically engaged with an edge of an opening of the shaft hole 41 of the base plate 4 at the outer end of a projecting shaft 35, so that the projecting shaft 35 of the auxiliary shaft member 3 is prevented from being extracted from the shaft hole 41, thereby stablizing the bearing operation of the auxiliary shaft member 3 and increasing the mechanical strength thereof.

The present invention is not limited to the embodiments mentioned above, but can be changed in accordance with various modifications within the scope of the invention.

For example, the step portion 22 of the cylindrical shaft portion 21 may be cut away, and the outside lever 1 may be fitted onto the shaft main body 31 between the end tip of the cylindrical shaft portion 21 and the elastic tongue pieces 34 of the auxiliary shaft member 3.

As mentioned above, in a support structure of a rotatable lever of the present invention, a shaft portion of the rotatable lever can be supported at both ends thereof so that the mechanical strength of a bearing portion of the lever is increased and the durability thereof is improved. Further, the bearing portion is stably actuated, and the rotatable lever is reliably rotated, and a door is reliably locked and unlocked.

What is claimed is:

1. A support structure in combination with a rotatable lever, comprising:
   a support body including a cylindrical shaft portion integrally formed with said support body and extending therefrom in an axial direction, said cylindrical shaft portion having an opening;
   a base member connected to said support body and having a shaft hole therein;
   an auxiliary shaft member including a main shaft body extending in an axial direction of said shaft member and supported in said opening of said cylindrical shaft portion, and a projecting shaft disposed at one end of the auxiliary shaft member and inserted in said shaft hole so that said projecting shaft is supported by said base member,
   said rotatable lever being pivotally positioned on said cylindrical shaft portion of said support body, said auxiliary shaft member supporting said rotatable lever on said cylindrical shaft portion for a pivotal movement thereon,
   said auxiliary shaft member further including at another end thereof insertion means constructed so as to enable said main shaft body to pass through said opening but prevent said cylindrical shaft portion of said support body from being disengaged from said auxiliary shaft member once said main shaft body has been inserted into said cylindrical shaft portion; and
   elastic means disposed between said base member and said main shaft body for biasing said rotatable lever towards said cylindrical shaft portion, said rotatable lever being disposed between said cylindrical shaft portion and said elastic means, whereby said cylindrical shaft portion is supported at both opposite ends thereof.

2. A support structure according to claim 1, wherein said insertion means is integrally formed with said main shaft body.

3. A support structure as claimed in claim 1, wherein said insertion means includes a flange portion disposed at said another end of the auxiliary shaft member and engaged with said cylindrical shaft portion and a slit formed in the auxiliary shaft member and extending in the axial direction thereof, said slit flexing said flange portion to enable said flange portion to be axially inserted into said opening of the cylindrical shaft portion.

4. A support structure as claimed in claim 3, wherein said elastic means comprises elastic pieces provided on said auxiliary shaft member and projecting in radial direction thereof.

5. A support structure as claimed in claim 4, wherein an outer circumferential step is provided at an end of the cylindrical shaft portion, said elastic pieces pressing the rotatable lever towards said step.

6. A support structure as claimed in claim 3, wherein the support body is made of synthetic resin.

7. A support structure as claimed in claim 3, wherein the auxiliary shaft member is made of synthetic resin.

* * * * *

UNITED STATES PATENT AND TRADEMARK OFFICE
CERTIFICATE OF CORRECTION

PATENT NO. : 4,896,990

DATED : January 30, 1990

INVENTOR(S) : Hitoshi Nakamura

It is certified that error appears in the above-identified patent and that said Letters Patent is hereby corrected as shown below:

On the title page insert:

[73] Assignee: Ohi Seisakusho Co., Ltd., Yokohama-shi, Kanagawa-ken, Japan

Signed and Sealed this

Twenty-eighth Day of January, 1992

Attest:

HARRY F. MANBECK, JR.

*Attesting Officer*    *Commissioner of Patents and Trademarks*